United States Patent

Aiani et al.

[15] 3,643,124

[45] Feb. 15, 1972

[54] CONSTANT SPEED VECTOR GENERATOR UTILIZING A VARIABLE SLOPE SAWTOOTH GENERATOR

[72] Inventors: Richard L. Aiani, Saugus; Bill T. Jones, Jr., Granada Hills, both of Calif.

[73] Assignee: International Telephone and Telegraph Corporation, New York, N.Y.

[22] Filed: Mar. 30, 1970

[21] Appl. No.: 23,868

[52] U.S. Cl. ....................315/22, 340/324 A

[51] Int. Cl. ....................H01j 29/52

[58] Field of Search ....................315/22; 340/324 A; 235/186

[56] References Cited

UNITED STATES PATENTS 3,325,802 6/1967 Bacon....................340/324 A

*Primary Examiner*—Rodney D. Bennett, Jr.
*Assistant Examiner*—J. M. Potenza
*Attorney*—C. Cornell Remsen, Jr., Walter J. Baum, Paul W. Hemminger, Charles L. Johnson, Jr. and Thomas E. Kristofferson

[57] ABSTRACT

A vector generator which produces a constant intensity trace on a viewing screen. A pair of output signals control the angle of a vector as it sweeps across the screen of a displaying tube. A first constant sawtooth output voltage is utilized to represent the first output signal and a second sawtooth output voltage, the slope of which is varied in proportion to the ratio of the input signal components is used to represent the second output signal.

5 Claims, 2 Drawing Figures

INVENTORS.
RICHARD L. AIANI
BILL T. JONES Jr.
BY
Harvey S. Hertz
ATTORNEY

INVENTOR.
RICHARD L. AIANI
BILL T. JONES JR
BY
Harvey S. Hertz
ATTORNEY

CONSTANT SPEED VECTOR GENERATOR UTILIZING A VARIABLE SLOPE SAWTOOTH GENERATOR

The invention relates in general to vector generators and, more particularly, to a generator for producing a constant intensity trace on a viewing screen.

BACKGROUND OF THE INVENTION

Vector generators are normally used in combination with peripheral equipment to produce information on a viewing screen. Typically, the viewing screen could be an oscilloscope and a vector would be drawn from a first point to a second point. Information is fed into the system as to the coordinates of the first point and the second point and then a line vector drawn on the screen which connects these points. Typical use of the generator could be to plot movement of an aircraft so as to determine periodically its movement and latest position. Heretofore, prior art vector generators utilized a multiple speed generating system to generate the vector. The vector produced did not have a constant intensity and, thus, the vector was at times lost from view. Further, prior art vector generators operated at relatively slow speeds and with the advent of high-speed aircraft the data produced on the screen was normally obsolete by the time it was reproduced thereon.

In order to overcome the attendant disadvantages of prior art vector generators, the present invention allows vectors to be generated at relatively high speeds in accordance with the needs of present day air traffic control conditions. Further, the present invention can generate a vector between the first point and a second point with a constant intensity since the beam is moved at a constant velocity. Moreover, the generator may be used in combination with state of the art equipment.

The advantages of this invention, both as to its construction and mode of operation, will be readily appreciated as the same becomes better understood by references to the following detailed description when considered in connection with the accompanying drawings in which like referenced numerals designate like parts throughout the figures.

DESCRIPTION OF THE PREFERRED EMBODIMENT

Figure 1:
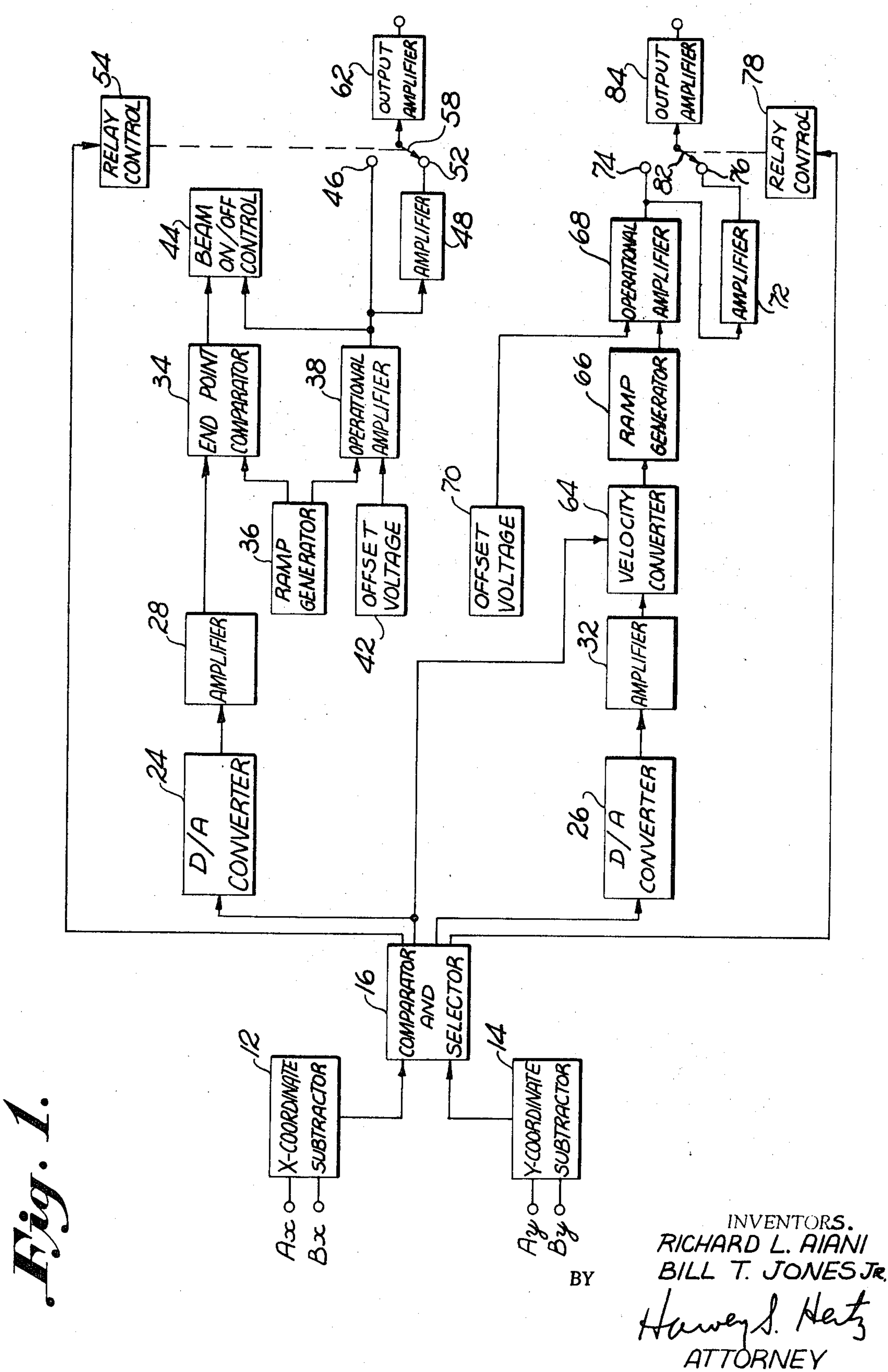
FIG. 1 depicts a block diagram of the vector generator in accordance with the present invention.

Referring now to FIG. 1 there is shown a block diagram of a preferred embodiment of the vector generator. The vector generator is utilized to generate a trace on a screen such as an oscilloscope from first point having the $x$, $y$ coordinates Bx, By, respectively to a second point having the $x$, $y$ coordinates Ax, Ay, respectively.

A first subtractor 12, whose digital input signals are Ax and Bx, produces an output signal equal to Ax minus Bx. A second subtractor 14 whose digital input signals are Ay and By produces an output signal equal to Ay minus By. The output signals from subtractors 12 and 14 are then fed to a digital comparator and selector 16. If the absolute value of the output of the subtractor 12 is greater than the absolute value of the output of the subtractor 14 then the comparator 16 will couple the output of subtractor 12 to a major component digital to analog converter 24 and couple the output of subtractor 14 to a minor component digital to analog converter 26. If, however, the absolute magnitude of the subtractor 14 is greater than the absolute value of the magnitude of the subtractor 12 then the comparator 16 will couple the output of subtractor 14 to a major component converter 24 and couple the output of subtractor 12 to minor component converter 26.

The converters 24 and 26 produced an analog output signal equal to the absolute value of their respective input signals and couple them to a first amplifier 28 and a second amplifier 32, respectively. The output of the amplifier 28 is coupled to an input terminal of an end point comparator 34. Also coupled to an input terminal of the end point comparator 34 is the output of an integrating ramp generator 36. The integrating ramp generator is also coupled to an input terminal of the operational amplifier 38. Also coupled to an input terminal of the operational amplifier 38 is a source of DC offset voltage 42. The output of the end point comparator 34 and the operational amplifier 38 are both coupled to a beam on-off control 44. Further, the output of the operational amplifier 38 is coupled to first output terminal 46 and to a phase reversing amplifier 48, the output of which is connected to an output terminal 52.

Further, signals from the comparator 16 are coupled to a relay control 54. The relay control 54, in turn, controls the position of a contact 58 which may be switched between the terminal 46 and the terminal 52. If the difference output of the subtractor 12 or 14 coupled to the converter 24 is a negative value then the relay control 54 will move the contact 52 to the output terminal 52 whereas if the output of the subtractor is of a positive value it will move the contact 58 to the terminal 46. Output signals from the terminal 46 or 52 are then coupled through the contact 58 to an output amplifier 62.

Figure 2:
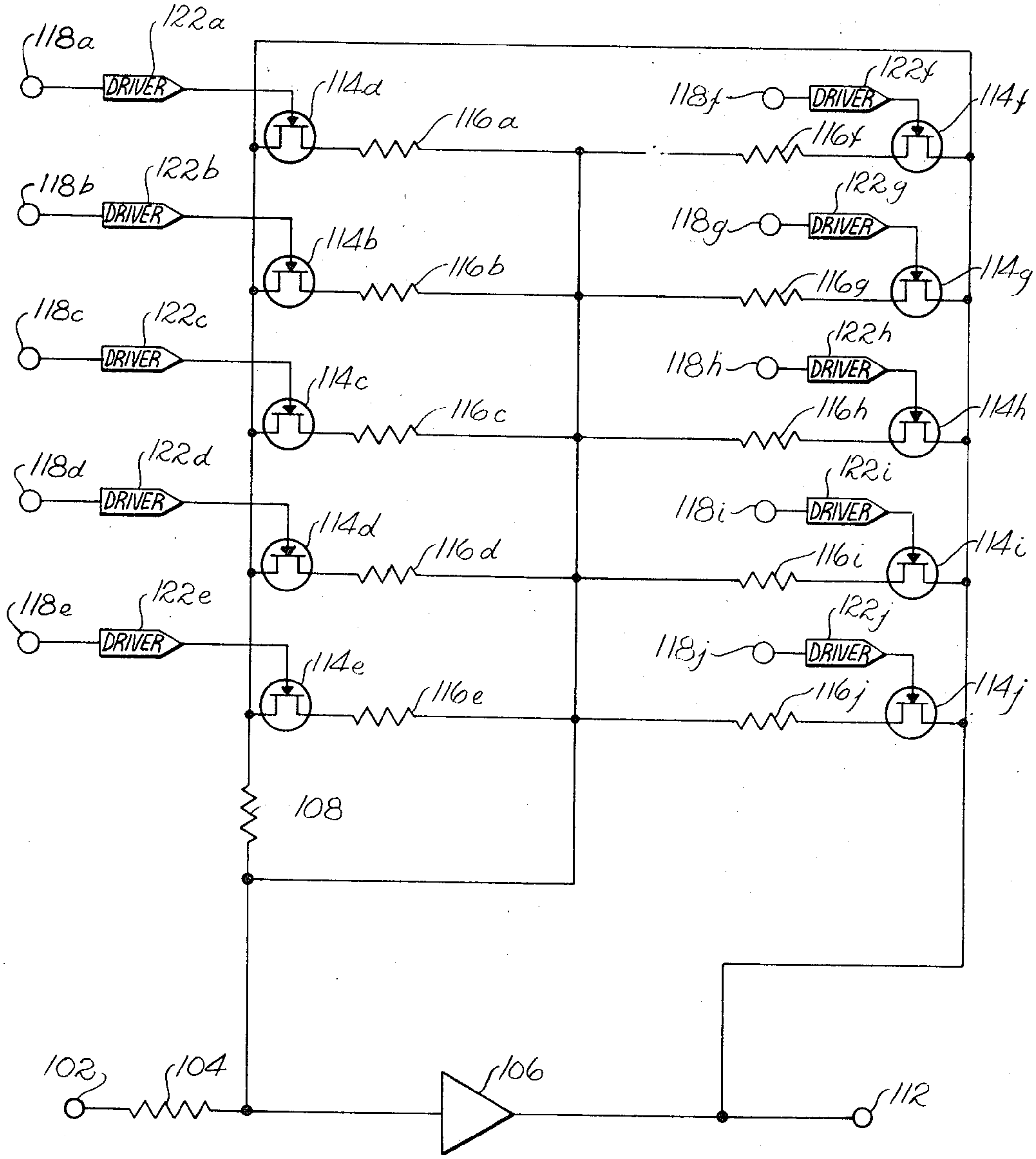
FIG. 2 illustrates a typical circuit diagram of the velocity converter depicted in FIG. 1.

Output signals from the amplifier 32 are coupled to a first input terminal of a velocity converter 64 which is shown in greater detail in FIG. 2. Moreover, output signals from the comparator 16 which are coupled to the converter 24 are also coupled to second input terminal of the velocity converter 64. Output signals from the velocity converter 64 are coupled to the input of a ramp generator 66. Further, output signals from the ramp generator 66 are coupled to a first input terminal of an operational amplifier 68. Coupled to a second input terminal of the operational amplifier 68 is a source of DC offset voltage 70.

Output signals from the amplifier 68 are coupled to a phase reversing amplifier 72 and to an output terminal 74. Output signals from the amplifier 72 are coupled to an output terminal 76. Further, signals from the comparator 16 are coupled to a relay control 78 which controls the position of contact 82. The relay control 78 determines whether the contact 82 is connected to the output terminal 74 or the output terminal 76, dependent upon the difference output of the subtractor 12 or 14 coupled to the converter 26. If the difference output of the subtractor 12 or 14 coupled to the converter 26 is a negative value, then the relay control 78 will move the contact to output terminal 76 whereas if the output of the subtractor is of a positive value it will move the contact 82 to the terminal 74. Output signals from terminal 74 or 76 are then coupled through the contact 82 to an output amplifier 84.

Referring now to FIG. 2 the velocity converter 64 contains an input terminal 102 having one side of an input resistor 104 connected thereto. The other side of the input resistor 104 is connected to one side of an operational amplifier 106 and to one side of a current limiting resistor 108. The other side of the current limiting resistor 108 and the other side of the operational amplifier 106 are connected to an output terminal 112.

Further, connected in parallel paths across the current limiting resistor are one of a plurality of field effect transistors 114 ($a$–$j$) connected in series at one of its emitter terminals to one of a plurality of resistors 116 ($a$–$j$), respectively. Input signals from the comparator 16 are applied to terminals 118 ($a$–$j$) of each path, respectively. Each of the terminals 118 ($a$–$j$), are connected to one side of drivers 122 ($a$–$j$), respectively, the other side of the drivers being connected to the base of the field-effect transistors 114 ($a$–$j$), respectively.

Digital data from the comparator 16 is coupled to the terminals 118 ($a$–$j$) of the velocity converter 64. As shown in FIG. 2, 10 input stages are provided which in turn are used to control the 10 parallel connected paths. If each of the resistors 116 ($a$–$j$) is increased in accordance with a standard binary progression, the range of the resistors can be varied from one unit to 1,024 units of resistance in steps of one unit of resistance each. Thus, the output signal voltage at terminal 112 varies in accordance with the formula:

$$e_o=(O-1{,}024)e_i$$

where $e_o$ = the output signal voltage at terminal 112; and $e_i$ = the input signal voltage at terminal 102.

It should be understood, of course, that more or less parallel paths could be used with the resistance across operational amplifier 106 varying accordingly.

As previously explained, digital input signals are applied to the subtractors 12 and 14. The inputs to the subtractor 12 are the $x$ coordinates of a first point and a second point between which the vector is to be generated and the input to the subtractor 14 are the $y$ coordinates of a first point and a second point between which the vector is to be generated. The subtractors 12 and 14 each produce an output signal which is the difference between the two $x$ coordinates and $y$ coordinates, respectively. The major component of the vector is coupled to the converter 24 and the minor component is coupled to the converter 26. The amplifiers 28 and 32 amplify the analog signals from the converters 24 and 26 respectively. The ramp generator 36 initiates a ramp voltage signal at approximately the same time as the input signals are coupled to the subtractors. When the ramp voltage amplitude from generator 36 equals the analog signal amplitude at the output of the amplifier 28, the end point comparator produces an output signal to a beam control 44 which turns off the beam in the equipment where the vector is being generated. Normally, this off beam control occurs slightly before the final portion of the vector is displayed so that time lags present in the viewing screen may be compensated for. Further, when the ramp generator initiates a signal upon an input thereto, this signal is coupled to an operational amplifier 38 which controls the initial positioning of the beam on the viewing screen. Since the ramp generator 36 will normally produce a nonlinear portion of a vector initially, an offset voltage signal 42 is coupled to the operational amplifier and provides sufficient bias so that the beam on control 44 initiates the signal trace after a predetermined portion of the ramp generator signal has been produced.

Normally, the output of amplifier 62 is coupled across one pair of orthogonal deflection plates of a cathode-ray tube and the output of amplifier 84 is coupled across the other pair of orthogonal deflection plates of a cathode-ray tube. The ramp generators 36 and 66 have equal periods. That is, the sweeps generated thereby start and terminate at the same time. In order to obtain the proper angle for the vector as it sweeps across the screen of the cathode-ray tube, the component in the output amplifier 84 is varied. Ramp generator 36 has a sawtooth output voltage, the slope of which always remains constant. Ramp generator 66 has a sawtooth output voltage, the slope of which is varied directly in proportion to the ratio of the minor component to the major component. Velocity converter 64 is actually a divider for dividing the output of amplifier 32 by the major component output of comparator 16. Ramp generator 66 is a conventional variable slope ramp generator. The slope of ramp generator 66 is thus controlled and made directly proportional to the ratio of the minor component to the major component. This is true because the output of velocity converter 64 that controls ramp generator 66 is directly proportional to that ratio.

Further, while the minor component signal has been modified in accordance with the major component signal it should be understood, of course, that the major component could have been varied in accordance with the minor component as well. Moreover, it should be understood that the entire system would normally be controlled by a clock (not shown) so that, for example, the offset voltage could initially begin to produce a signal prior to the time the beam on/off control actually produces a trace on the cathode-ray tube.

What is claimed is:

1. A vector generator for producing a first output signal and a second output signal for controlling the angle of a vector having a first component and a second component as it sweeps across the screen from a first point to a second point on a display tube comprising: a first ramp generator producing a sawtooth output voltage, the slope of which is constant, representative of said first output signal; and a second ramp generator producing a sawtooth output voltage the slope of which is varied in proportion to the ratio of said components and is representative of said second output voltage signal.

2. A vector generator in accordance with claim 1 wherein a first input signal is produced representative of the magnitude of one of said components and a second input signal is produced representative of the other of said components.

3. A vector generator in accordance with claim 1 wherein offset voltage means are provided for initiating said sawtooth output voltages so as to compensate for nonlinear portions of said vector being displayed.

4. A vector generator in accordance with claim 2 wherein a velocity converter is provided whose input signals are representative of said vector components, said velocity converter including an operational amplifier having a variable gain in accordance with the ratio of said input signals.

5. A vector generator in accordance with claim 2 wherein said constant slope sawtooth voltage is terminated by means of an end point comparator when the magnitude of said sawtooth voltage substantially equals the magnitude of one of said input signals.

* * * * *